US006205711B1

(12) United States Patent
Klippert

(10) Patent No.: US 6,205,711 B1
(45) Date of Patent: Mar. 27, 2001

(54) DEVICE FOR ATTACHING A SLIDEABLE WINDOW PANE OF A MOTOR VEHICLE TO THE CONTROL DEVICE OF A WINDOW WINDER

(75) Inventor: Uwe Klippert, Oberaula (DE)

(73) Assignee: Brose Fahrzeugteile GmbH & Co. KG, Coburg (DE)

( * ) Notice: Subject to any disclaimer, the term of this patent is extended or adjusted under 35 U.S.C. 154(b) by 0 days.

(21) Appl. No.: 09/331,240

(22) PCT Filed: Dec. 19, 1997

(86) PCT No.: PCT/DE97/03020

§ 371 Date: Jun. 18, 1999

§ 102(e) Date: Jun. 18, 1999

(87) PCT Pub. No.: WO98/27302

PCT Pub. Date: Jun. 25, 1998

(30) Foreign Application Priority Data

Dec. 19, 1996 (DE) .............................................. 196 53 046

(51) Int. Cl.[7] ........................................................ B60J 1/00

(52) U.S. Cl. ............................................................... 49/375

(58) Field of Search ............................ 49/374, 375, 358, 49/351, 352; 52/716.5; 403/353

(56) References Cited

U.S. PATENT DOCUMENTS 2,556,839 * 6/1951 Cretella ................................ 403/353
4,014,219 * 3/1977 Feustel et al. ....................... 403/353
4,128,354 * 12/1978 Amrogowicz ........................ 403/353
5,061,108 * 10/1991 Bien et al. ........................... 403/353
5,515,651 5/1996 Hofmann et al. ....................... 49/375

FOREIGN PATENT DOCUMENTS 31 08 244 A1 6/1982 (DE) .
43 16 651 A1 11/1994 (DE) .
44 23 440 A1 2/1995 (DE) .
44 40 170 A1 5/1996 (DE) .
6-135228 5/1994 (JP) .

* cited by examiner

*Primary Examiner*—Daniel P. Stodola
*Assistant Examiner*—Curtis A. Cohen
(74) *Attorney, Agent, or Firm*—Christie, Parker & Hale, LLP

(57) ABSTRACT

A device for securing an adjustable window of a motor vehicle to a guide mechanism of a window lifter, having a first component with an elevated stopper and a second component with an essentially horizontal, elongated recess into which the stopper can positively lock, whereby one of the two components is connected to the window and the other component is connected to the window lifter, characterized in that the recess of the second component has an entry passage pointing in the direction of the stopper; there is an interval between the vertical central axis of the entry passage and the vertical central axis of the stopper, the horizontal dimension of the recess is at least 1.5 times the breadth of the stopper, and the stopper can be secured in order to ensure that it remains in the attachment area. Installation and adjustment of the window are simple and secure and the operational reliability of the window is thereby increased. If necessary, blind assembly is also possible.

16 Claims, 5 Drawing Sheets

Fig. 3a
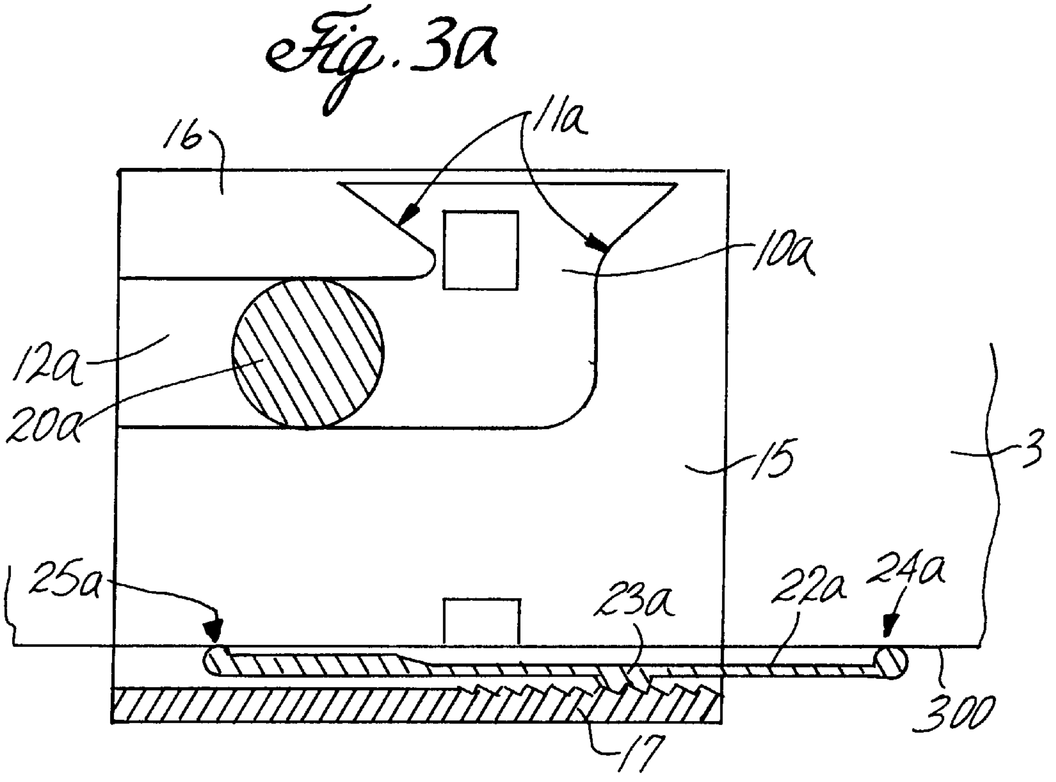
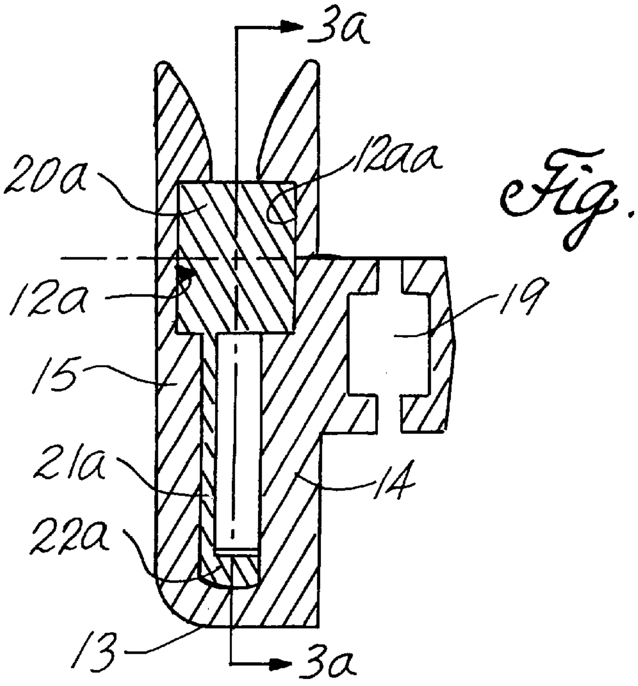
Fig. 3b

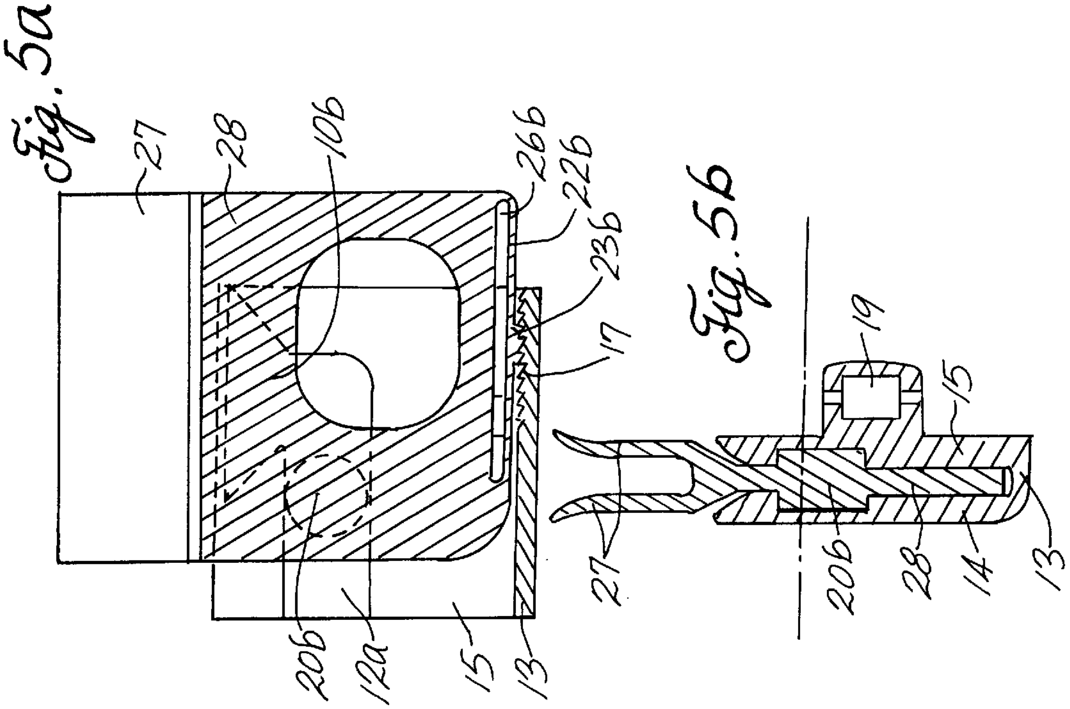
Fig. 5a
Fig. 5b
27
28
10b
26b
22b
23b
17
20b
12a
15
13
19
14
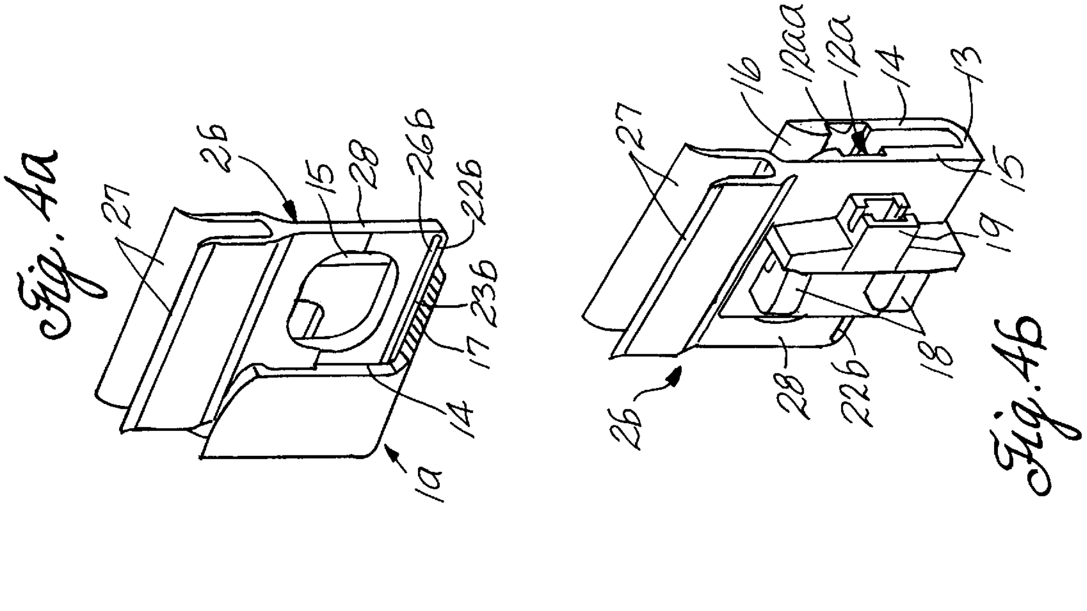
Fig. 4a
Fig. 4b
27
26
15
28
26b
22b
23b
17
14
1a
16
12aa
12a
13
19
18

Fig. 6a
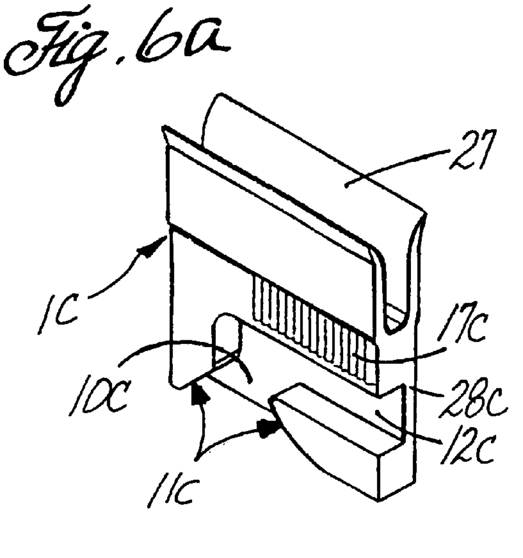
Fig. 6b
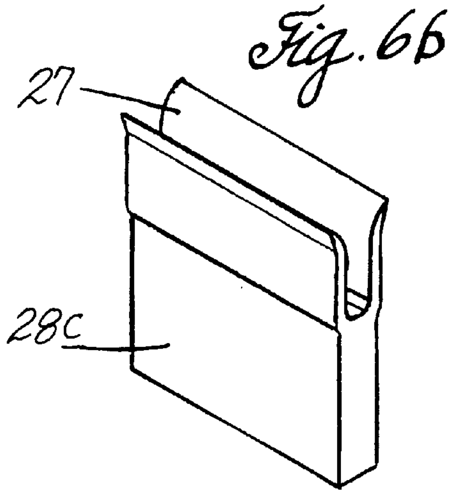
Fig. 7a
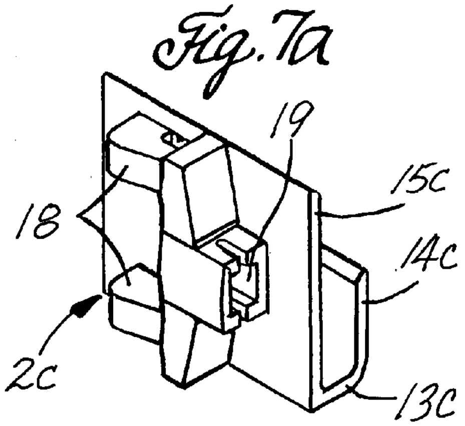
Fig. 7b
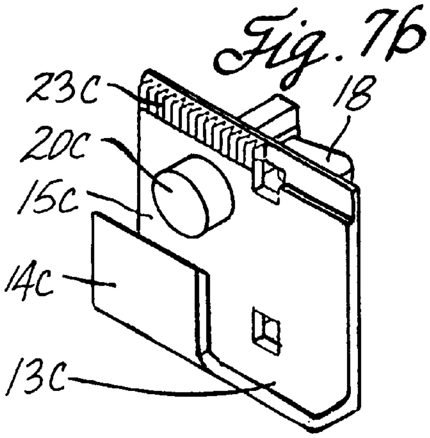
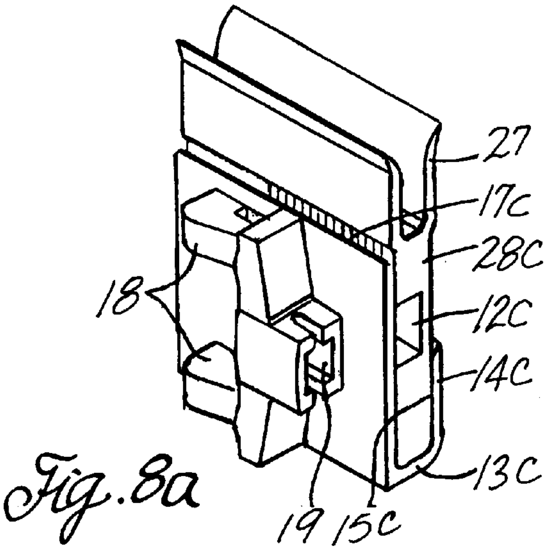
Fig. 8a
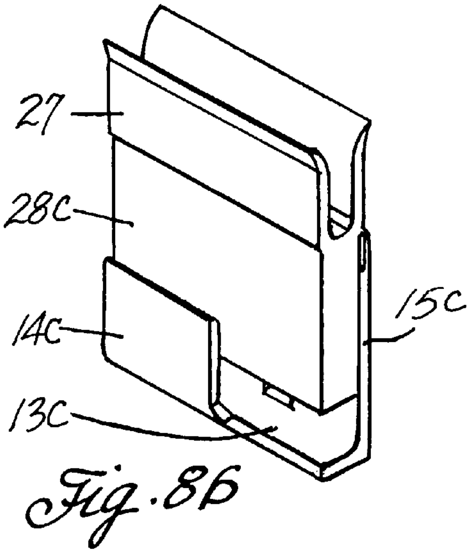
Fig. 8b

DEVICE FOR ATTACHING A SLIDEABLE WINDOW PANE OF A MOTOR VEHICLE TO THE CONTROL DEVICE OF A WINDOW WINDER

BACKGROUND OF THE INVENTION

The invention relates to a device for securing an adjustable window of a motor vehicle to a guide mechanism of a window lifter, wherein installation and adjustment of the window are simple and secure and the operational reliability of the window is increased at the same time.

DE 43 16 651 A1 disclosed a securing device for connecting a gripper of a window lifter to a window, wherein an attachment component of the gripper in the form of a bolt engages an opening within the window. The diameter of the head of the bolt is enlarged in relation to the cavity. The bolt is inserted, perpendicularly to the window surface, into the window opening with a corresponding diameter, and subsequently displaced into a guide area. The dimensions of the guide area thereby correspond to the diameter of the shaft.

DE 31 08 244 A1 disclosed a coupling device between a window lifter and a window of a motor vehicle, which basically consists of a retaining device secured to the bottom edge of the window and at least one coupling jaw which is equipped with a means of locking and projects towards a coupling component which is equipped with adaptable locking components and connected to the window lifting mechanism. When the connecting components are brought together, this results in an elastic deformation of at least one of the coupling components until the connection is brought about by the interlocking of the components.

A disadvantage, however, is that in order to bring about the connection between the window and the window lifter, the expansion area must have a minimum resilience, so that the locking components can interlock. However, this resilience also brings with it the risk that, in the case of heavy loads such as those that may arise when the window is frozen to the frame, the locking components unlock again.

This would mean that the window lifting mechanism could no longer perform its function. In addition to this, it is difficult to position the locking components so precisely in relation to each other that they are able to interlock. Therefore, it is often necessary to move the window back and forth in the X-direction in order to bring about positive locking.

JP 6-135228 A disclosed a device for connecting a window to a window lifter. On the window lifter, there are U-shaped profile components running parallel to the bottom edge of the window, whereby the free sides of the U-shaped profile have hook-like extensions pointing inwards. Corresponding to these profile components are adaptable coupling components that can lock into the U-shaped cavity. These coupling components are secured to the bottom edge of the window. In order to facilitate the connection, the free ends of the coupling components are wedge-shaped and their barbed extensions can engage the extensions of the U-shaped profile. Nonetheless, it is generally necessary for the worker to apply pressure upon the window in the assembly direction, in order to bring about the required positive locking. Screws are used to secure the area between the window lifter and the window in line with the cavities and grooves. There is just as little possibility of adjusting the window in the X-direction (longitudinal axis of the vehicle) in order to reach an ideal position as there was with the design that was initially described.

DE 44 23 440 A1 disclosed a further window connection using elastically deforming and thereby pivotable regions.

The pivotable regions form the upper edge of the recesses of two parallel lateral sides, into which a connecting component of the window can lock. Suitable connecting components are supposedly a bolt positioned in a window cavity, a component stuck onto the window or a component formed from the window itself.

Even this securing device presents the disadvantage that the elastic fields of the lateral sides have a reduced load-bearing capacity. Therefore, there is a risk of the connection coming apart in the event of strong forces on the window.

SUMMARY OF THE INVENTION

It is an object of the invention to create a device that locks itself during window assembly onto the window lifter in such a way that the weight of the window is sufficient to allow interlocking of the components and also to ensure that the window can be adjusted in the X-direction. In addition to this, in comparison with other previously disclosed devices, the securing device according to the invention should significantly increase the load-bearing capacity in relation to the window.

According to the invention, there is an entry passage for insertion of the stopper into the elongated recess extending in the X-direction so that there is no need for elastic or expanding fields of the securing device. This is facilitated by a functional division of the securing device into two areas: namely into one area exclusively for insertion of the stopper into the positive-locking area of the associated component of the securing device; and into another area exclusively for transferring the shifting forces of the window lifter.

The transfer of the stopper from the entry area into the attachment area formed by the elongated recess takes place by means of displacement in the X-direction. This displacement can be initiated either by the worker or automatically through the alignment of the window in the frame of the motor vehicle door during the first closing operation of the window lifter. In order to ensure reliable operation of the securing device according to the invention, it is important that after window assembly the vertical axes of the entry area (the entry passage) and of the stopper are positioned at least as far away from each other as to ensure a sufficiently large overlap between the stopper and the elongated recess and hence sufficient load-bearing capacity of the securing device.

In addition to this, there must be a means of preventing any unintended sliding of the stopper out of the elongated recess and into the entry passage. The securing device would not work if this happened. On the one hand it is necessary not to impede assembly movement and on the other hand it is necessary to prevent backward movement of the stopper. An appropriate, simple solution is the use of serrated locking components positioned, on the one hand, on the component bearing the stopper and, on the other hand, on the component bearing the elongated recess, whereby these locking components interlock by means of a spring. The upright side of the serrated profile is thereby pointing contrary to the direction of assembly of the stopper. The spring elasticity of the connection of the locking components allows problem-free assembly of the securing device, as the locking components can simply slide on top of each other in the assembly direction.

It is useful if the width of the entry passage and the breadth of the stopper correspond as closely as possible. In order to facilitate entry of the stopper, the stopper has a rounded—possibly circular—contour in its lower area at least. Also, in front of the entry passage, there are conical guide surfaces opening in the direction of the stopper.

The two components of the securing device according to the invention can either be connected to the window or to the guide mechanism of the window, as one chooses. This means that either the stopper is secured to the window and the corresponding elongated recess is secured to the guide mechanism of the window lifter or the other way round. Ideally, the component connected to the guide mechanism will form a single, homogenous component with the gripper of a cable window lifter. The component to be connected to the window also forms a single component and is for example stuck to the bottom edge of the window or positively locked in a window cavity in the region of the bottom edge of the window. If synthetic windows are used, it is also possible for the corresponding component to be molded in the material of the window.

The forces exerted upon the windows can differ significantly from vehicle to vehicle. Accordingly, therefore, the stability requirements of the force-transferring components also vary greatly. It can, for example, be sufficient in many cases for the components of the securing device according to the invention to be manufactured from synthetic material. In other cases, it is necessary to use light metal casting to produce components that are capable of bearing a load. For design reasons, when using such metal components, it may not be possible to incorporate a spring area which allows a sufficient spring excursion for the locking components. In this case, a separate spring component must be used, allowing the locking components to slide on top of one another during window assembly. In addition to this, however, other kinds of security mechanisms can also be used to prevent backward movement, e.g. screws, sticking, etc.

BRIEF DESCRIPTION OF THE DRAWINGS

The invention will now be explained in greater detail by reference to embodiments of the invention as illustrated. The drawings show:

FIG. 3*a* longitudinal section of a securing device according to FIG. 2 after window assembly;

FIG. 3*b* cross-section of a securing device according to FIG. 2 after window assembly;

FIG. 4*a* perspective diagram of a securing device after window assembly, whereby the component which is to be stuck to the bottom edge of the window bears the stopper;

FIG. 4*b* rotated view of FIG. 4*a;*

FIG. 5*a* longitudinal section through FIG. 4*a;*

FIG. 5*b* cross-section through FIG. 4*a;*

FIGS. 6*a* and 6*b* perspective diagrams of the component which is to be stuck to the bottom edge of the window, with an elongated recess and lateral locking components, whereby this is shown from different angles;

FIGS. 7*a* and 7*b* perspective diagram of the component on the window lifter side, with a stopper and lateral locking components, whereby this is shown from different angles;

FIGS. 8*a* and 8*b* perspective diagrams of the securing device after window assembly, whereby this is shown from different angles;

FIG. 9*e* side view of the securing device of FIG. 8*a* with the window.

DETAILED DESCRIPTION OF THE INVENTION

Figures 1A, 1B, 1C, 2A, 2B, 2C:
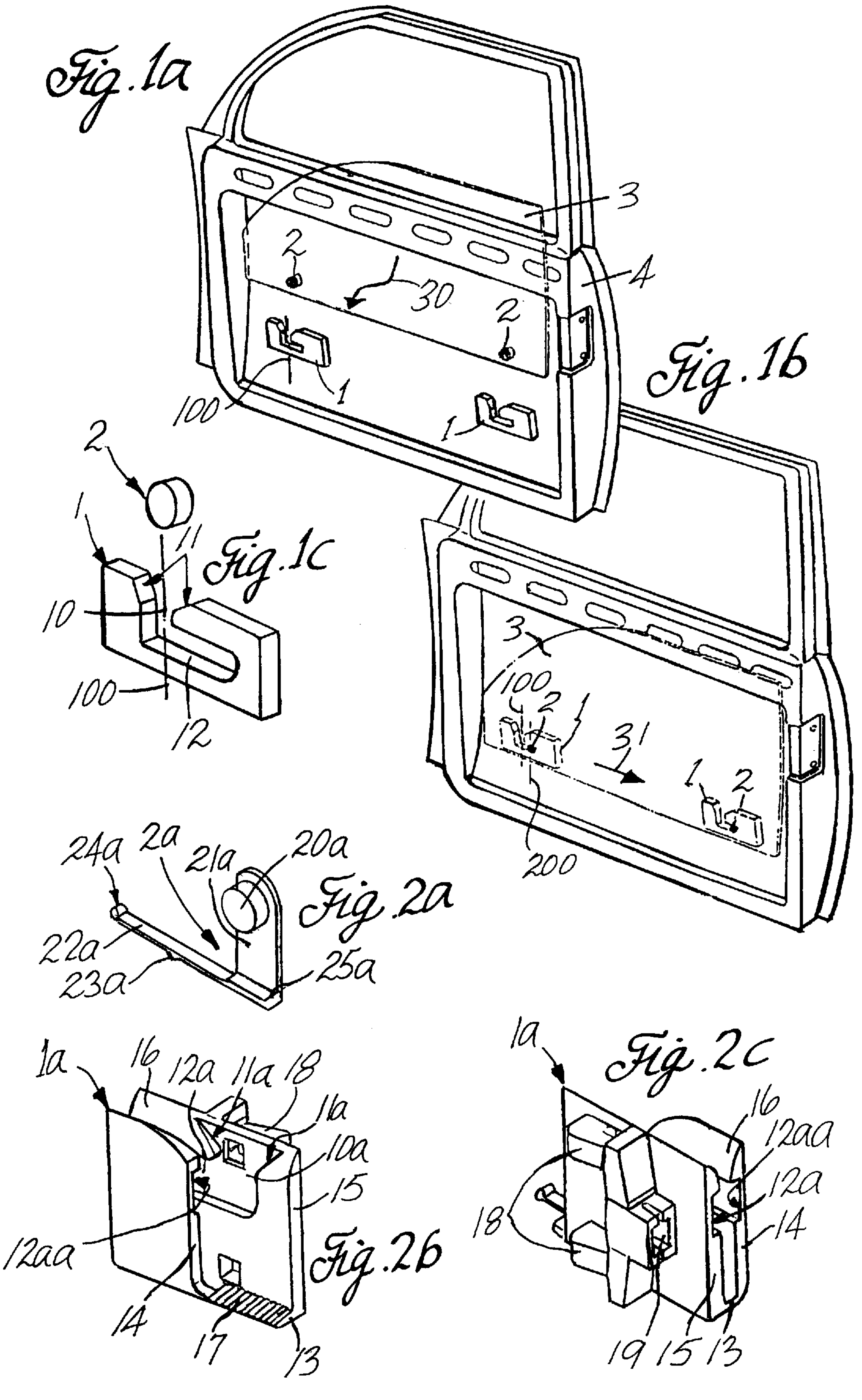
FIG. 1*a* schematic diagram of the invention before window assembly.
FIG. 1*b* schematic diagram of the invention after window assembly.
FIG. 1*c* schematic diagram of the principle of the invention.
FIGS. 2*a* to 2*c* perspective diagrams of the essential component of a securing device according to the invention using a window cavity and base locking components (before window assembly), whereby this is shown from different angles.
Figure 9B:
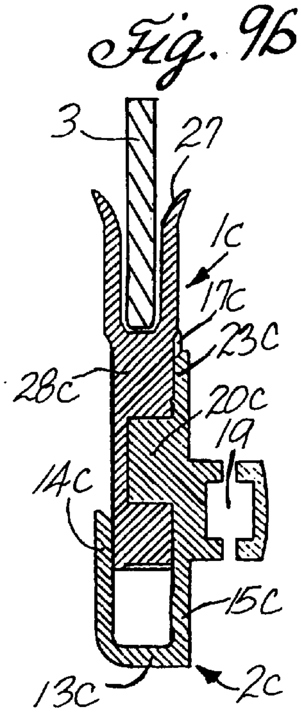
FIG. 9*b* transverse section of the securing device along the vertical axis of the stopper.
Figure 9A:
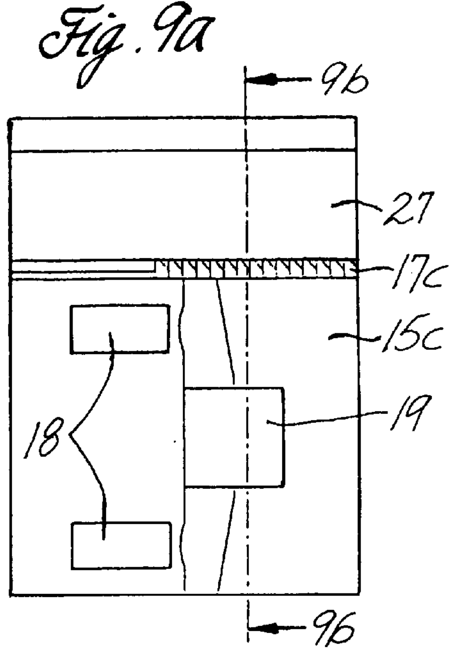
FIG. 9*a* side view of the securing device of FIG. 8*a;*
Figure 9C:
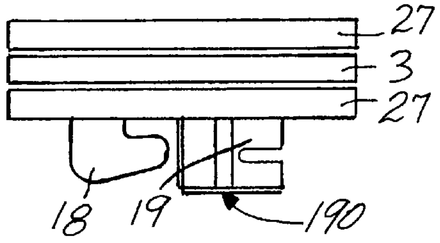
FIG. 9*c* plan view of the securing device of FIG. 8*a;*
Figure 9C:
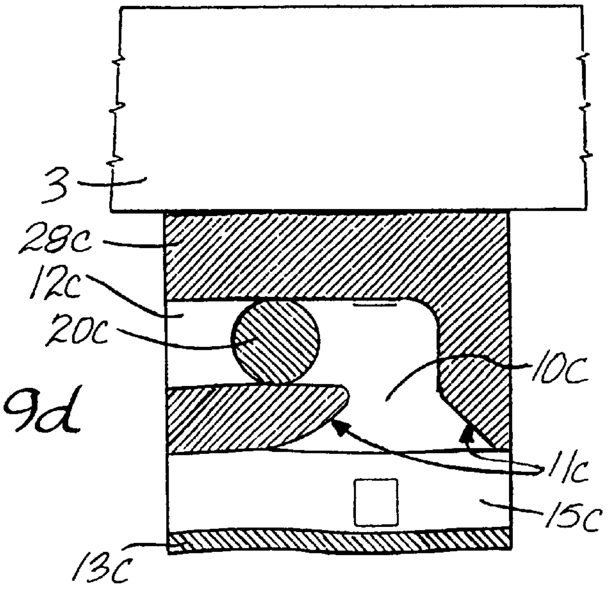
Figure 9D:
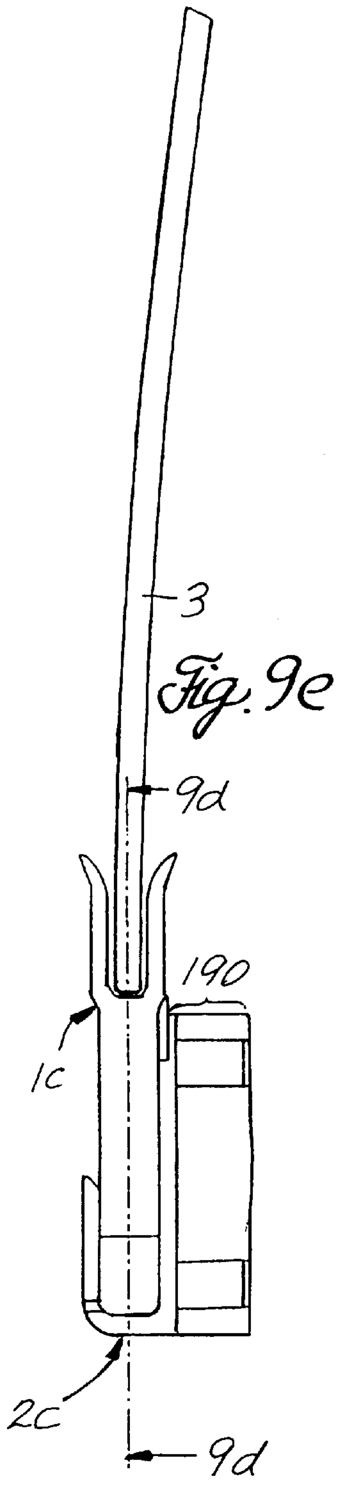
FIG. 9*d* longitudinal section of the securing device of FIG. 8*a* after window assembly.

The schematic diagrams 1*a* to 1*c* illustrate clearly and simply the principle of the present invention. According to the invention, the securing device consists of a first component with a stopper 2 and a second component 1 with a horizontal elongated recess 12, which acts as a guiding passage and attachment area for the stopper 2 once the latter has been inserted into a lateral entry passage 10 which is facing the stopper.

The invention can be used anywhere where the window has a lateral displacement which is sufficient to allow the stopper 2 to be brought into position through the entry passage 10. Conical guide surfaces 11 positioned before the entry passage 10 facilitate so-called "blind assembly", whereby the connection takes place without visual supervision. A further advantage relates to tool-free assembly through the invention particularly suitable for use on so-called modular supports which form a damp-proof partition between an external wet area and an internal dry area of the vehicle door. As no tools are required to connect the window to the window lifter, it is also possible to dispense with assembly slots in the partition and the subsequent sealing thereof.

FIG. 1*a* shows the start of the window assembly process, using a vehicle door with a dual-track cable window lifter which is not illustrated, whereby component 1 is supposed to represent the area of the gripper, which positively connects with the cable loop of the window lifter. First of all, the window 3 is inserted through the door shaft into the inner door bodywork 4 (assembly direction 30) and lowered until the bolt-shaped stopper 2 which is positioned in a window cavity has penetrated the entry passage 10 and is lying on the base of the elongated recess 12. In a second assembly stage, the window 3 is displaced horizontally in the assembly direction 31 until it has reached its correct position. This is associated with displacement of the stopper 2 into the attachment area (recess 12) of component 1. Consequently, there is an interval between the vertical central axes 100, 200 of the entry passage 10 and the stopper 2, respectively. In order to prevent a backward movement of the stopper 2 contrary to the assembly direction 31 and the associated risk of the window unlocking, special, unilateral locking components are provided, which are explained in greater detail in the following embodiments of the invention.

At this stage, however, it should be pointed out that in the case of dual-track cable window lifters, locking components are only necessary on the securing device of one of the guideways. The stopper of the other securing device is supposed to move "freely" in the elongated recess 12 and thus balances the parallelism tolerances of the two guideways.

The design of the securing device according to FIGS. 2*a* to 3*b* is such that its components 1, 2 can be conveniently manufactured by synthetic material injection. The high degree of integration means that the securing device, including the gripper with nipple chamber 19 and hooks 18, consists of only two components 1, 2. Component 2 comprises a bolt-like stopper 20*a*, which is positioned asymmetrically on a connecting component 21*a* with a web 22*a*. Corresponding to the web 22*a* is the bottom edge of the window 3 which can support itself on the elevated support surfaces 24*a*, 25*a*. On the bottom edge of the web 22*a*, there are locking components 23*a*, and after window assembly these interlock with the opposite locking components 17 of the component 1*a*. The locking component 20*a* is higher on the side of the connecting component 21*a* which lies on the window surface 3 than it is on the other side (which is not visible). The difference corresponds approximately to the thickness of the window. It is advantageous if component 2*a* is equipped with an anti-loss mechanism, so that it cannot fall out after being clipped into the window cavity.

The component on the guideway side is shown from two angles in FIGS. 2*b* and 2*c*. It consists of the parallel lateral sides 14, 15 which are connected to each other by means of the base 13. The lateral side 14, which bears only the recess 12*aa* on its inner side, had to be shortened in order to ensure injection tool deformation within the scope of the desired high degree of integration. Built into the inner side of the other lateral side 15 are the recess 12*a* as well as the entry passage 10*a* with the conical guide surfaces 11*a* which are positioned in front of it. The outer side of the lateral side 15 bears the hooks 18 which positively lock with the guideway, and it also bears the nipple chamber 18 by means of which positive locking with the force-transferring cable loop of the window lifter is ensured.

During window assembly, the component 2*a* which is secured around the bottom edge of the window goes into the intermediate space of component 1*a*. The stopper 20*a* thereby comes firstly into contact with a conical guide surface 11*a* before it goes through the entry passage 10*a*. When the lowest position is reached, the serrated locking components 17, 23*a* also connect with each other. When the stopper 20*a* is displaced into the recesses 12*a*, 12*aa* (in the assembly direction 31), the locking components 17, 23*a* slide on top of one another, whereby the web 22*a* is bent upwards towards the bottom edge of the window 300. Backward movement is prevented by the serrated contour of the locking components 17, 23*a*.

The transverse sections of FIGS. 3*a* and 3*b* show the position of the stopper 20*a* in the recess 12*a* after complete window assembly. The securing device according to FIGS. 4*a* and 4*b* shows different angles after complete window assembly and the component used as the component on the guideway side 1*a* is identical to component 1*a* in FIG. 2*b* and FIG. 2*c* respectively. The other component 2*b* has a support panel 28 with a stopper 20*b*, and on the upper end of the support panel there are two essentially parallel lateral sides 27 which accommodate the window 3. Regarding the securing of component 2*b*, it is generally stuck to the bottom edge of the window 3.

From the transverse sections of FIGS. 5*a* and 5*b*, the position of the stopper 20*b* within the elongated recess 12*a* is clearly visible. Even the form of the locking components 17, 23*b* shows clearly that during assembly movement of component 2*b*, from the entry passage 10*b* into the recess 12*a*, the locking components can slide on top of each other. The locking units 23*b* which are positioned on the web 22*b* are thereby pushed upwards towards the opening 26*b*.

A backward movement towards the entry passage 10*b* is prevented by the corresponding serration of the locking components 17, 23*b*.

In contrast with the afore-mentioned embodiments of the invention, the embodiment of the invention shown in FIGS. 6*a* to 9*e* has the elongated recess 12*c* on component 1*c*, which is to be securely attached to the window 3, whereas the component 2*c* on the guideway side bears the stopper 20*c*. In addition, the locking components 17*c*, 23*c* have been moved to lateral surfaces of components 1*c*, 2*c*. This embodiment of the invention is also suitable for use as a light metal casting component. Due to the shortened lateral side 14*c* of the component 2*c*, during window assembly there can be sufficient tilt movements between the components 1*c* and 2*c* to enable their locking components 17*c*, 23*c* to slide on top of each other as necessary.

In all other respects, however, the assembly takes place using the basic procedure already described. Thus the component 1*c* which is secured to the window 3 is brought towards the component 2*c* on the window lifter side until it positively locks with the stopper 20*c* of the component 2*c* via its conical guide surfaces 11*c*, the entry passage 10*c* and the recess 12*c*. At this stage, it should be pointed out that the stopper 20*c* does not necessarily have to have a bolt-like contour. Elliptic or angular contours or combinations thereof can also be used. It seems advantageous, however, if rounded contours are used at least on the side of the stopper 20*c* which faces the entry passage.

With regard to the outer side of the lateral side 15*c*, this bears a gripper area 190 with the nipple chamber 19 as well as hooks 18 for the adjustable attachment of the component 2*c* to the guideway of a cable window lifter.

What is claimed is:

1. A device securing an adjustable window of a motor vehicle to the guide mechanism of a window lifter, comprising:

a first component having an elevated stopper, the stopper having a central axis;

a second component having a horizontally extending elongated recess, positioned essentially at a right angle to an adjustment direction of the window, along a surface of the window wherein the stopper interlocks with the elongated recess, and wherein one of the two components is attached to the window lifter and the other component is attached to the window;

wherein the recess includes a vertically extending entry passage so that the stopper can be inserted into the entry passage, the entry passage having a central axis, the central axis of the entry passage being a distance from the central axis of the stopper during operation;

wherein the dimension of the horizontally extending recess at right angles to the adjustment direction of the window is at least 1.5 times the breadth of the stopper;

wherein the stopper is secured so that it remains in the recess during operation.

2. A device according to claim 1 wherein a portion of the width of the entry passage corresponds approximately to the breadth of the stopper.

3. A device according to claim 1, wherein the vertically extending entry passage includes a v-shaped mouth portion of increased width so that the stopper can be inserted into the entry passage.

4. A device according to claim 1 wherein the stopper has a side facing the entry passage and a rounded contour on the side facing the entry passage.

5. A device according to claim 1 wherein the second component (1*a*, 1*c*) comprises two lateral sides running parallel to the window surface, the lateral sides being connected by a base wherein at least one of the lateral sides has an inner side, a recess on the inner side, and an entry passage to the recess.

6. A device according to claim 1 wherein the second component is integrally attached to a gripper of the window lifter.

7. A device according to claim 1 wherein the stopper comprises a synthetic bolt.

8. A device according to claim 1 wherein the stopper is a constituent part of a securing device connected to a bottom edge of the window.

9. A device according to claim 1 wherein the stopper is a single constituent part of a synthetic window.

10. A device according to claim 1 wherein the recess is a constituent part of a gripper of the window lifter.

11. A device according to claim 1 wherein the second component is connected to a bottom edge of the window lifter and the recess is a constituent part of the second component.

12. A device according to claim 1 wherein the second component is a single constituent part of a lower area of a synthetic window.

13. A device according to claim 1, comprising a locking area which allows displacement of the stopper in an assembly direction from the entry passage into the horizontal recess and prevents backward movement.

14. A device according to claim 13 wherein the locking area comprises locking components which are constituent parts of the first component and the second component and which can positively lock by means of a spring.

15. A device according to claim 13 where in the locking area comprises locking components which are constituent parts of a synthetic window and wherein the locking components positively lock by means of a spring.

16. A device according to claim 13 wherein the locking area comprises serrated locking components.

* * * * *